Figure 1:
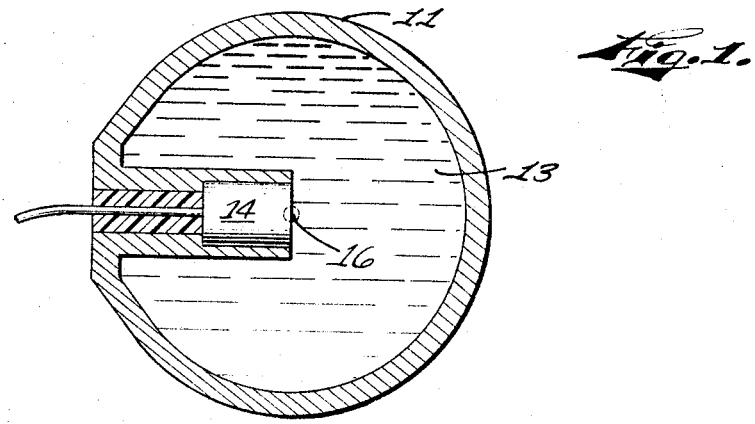

Sept. 6, 1966  W. W. HAWLEY ETAL  3,270,565
OMNIDIRECTIONAL ACCELERATION DEVICE
Filed Dec. 26, 1962  2 Sheets-Sheet 1

DAVID H. GEIPEL INVENTORS
WILBUR W. HAWLEY
WILLIS D. LONGYEAR
BY John R. Faulkner
John A. Duffy
ATTORNEYS

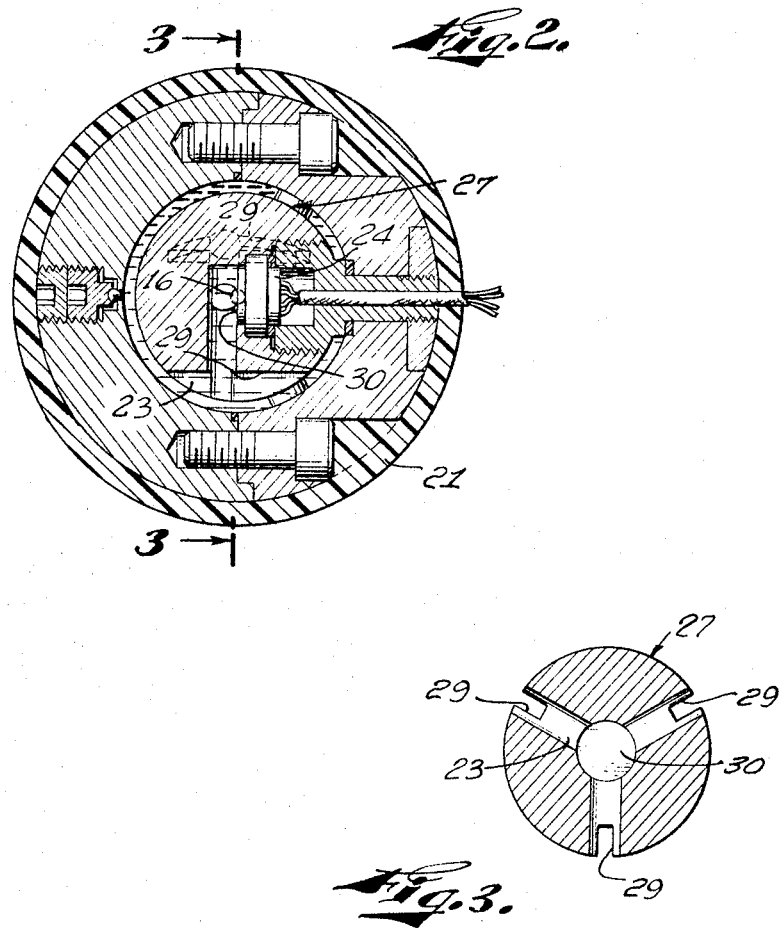

United States Patent Office 3,270,565
Patented Sept. 6, 1966

3,270,565
OMNIDIRECTIONAL ACCELERATION DEVICE
Wilbur W. Hawley, Santa Ana, David H. Geipel, Fullerton, and Willis D. Longyear, Newport Beach, Calif.; granted to National Aeronautics and Space Administration under the provisions of 42 U.S.C. 2457(d)
Filed Dec. 26, 1962, Ser. No. 247,136
3 Claims. (Cl. 73—497)

This invention relates to liquid filled accelerometers and more particularly to an accelerometer for measuring the magnitude of acceleration forces independent of direction.

The recent advent of space travel and the need to investigate planetary surfaces has created the need for a variety of testing and measurement devices. One such device required is a means for measuring acceleration forces which are omnidirectional in nature. The device must be capable of measuring the magnitude of acceleration forces independent of direction and, in addition, possess the qualities of extensive linear range of sensitivity, workable output signal, ruggedness, and extreme reliability.

Directional accelerometers are well known in the art and are available in almost any degree of simplicity, accuracy, and reliability. However, such accelerometers all have the property of being designed to measure the component of acceleration in a specific direction. The measured acceleration in general is a function of the magnitude of the applied acceleration vector with respect to the direction of the sensitive axis of the instrument. In order to provide an omnidirectional sensing capability several unidirectional accelerometers responsive to acceleration forces acting in different directional axes must be combined. Basically, omnidirectional accelerometer devices in the art have combined the vector signals from a plurality of accelerometers and presented the combined output signals to summing circuits for producing a single output. Such accelerometers are by their nature more complicated and offer much to be desired in reliability, simplicity, and accuracy. Accordingly, it is an object of this invention to provide an accelerometer sensitive to acceleration forces in all directions.

According to a principal aspect of the accelerometer of this invention, a liquid filled spherical housing is provided in which the changes in static pressure of the liquid are directly proportional to the acceleration force on the housing. The magnitude of the static pressure changes of the liquid at the center of the housing is independent of the direction of the acceleration forces. By measuring the static pressure of the liquid in the spherical housing, the magnitude of acceleration forces in any direction can be obtained.

According to another aspect of the invention a liquid filled accelerometer is provided in which a chamber in a spherical housing is filled with a liquid. The static pressure of the liquid is measured at the center of the housing providing an output directly proportional to the acceleration forces in any direction on the housing. Means are provided in the chamber for compensating for temperature changes in the housing and the liquid.

It is therefore another object of this invention to provide an omnidirectional accelerometer device.

It is a still further object of this invention to provide a liquid filled omnidirectional accelerometer.

It is a further object of this invention to provide a liquid filled spherical housing for measuring acceleration forces from any direction.

Figure 4:
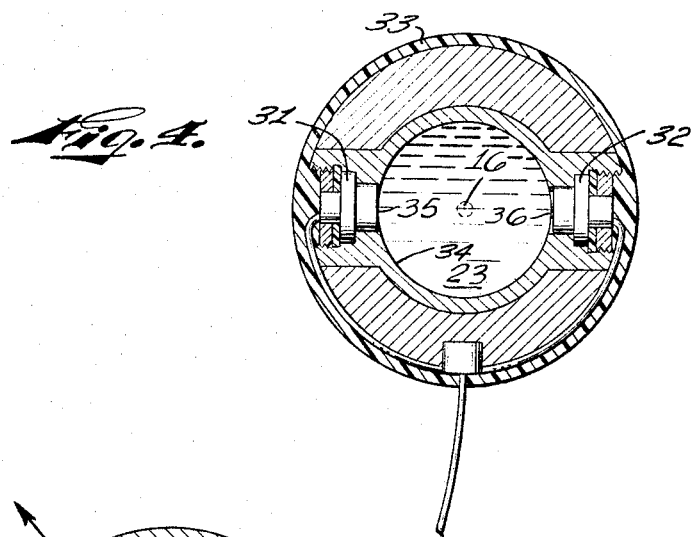
Figure 5:
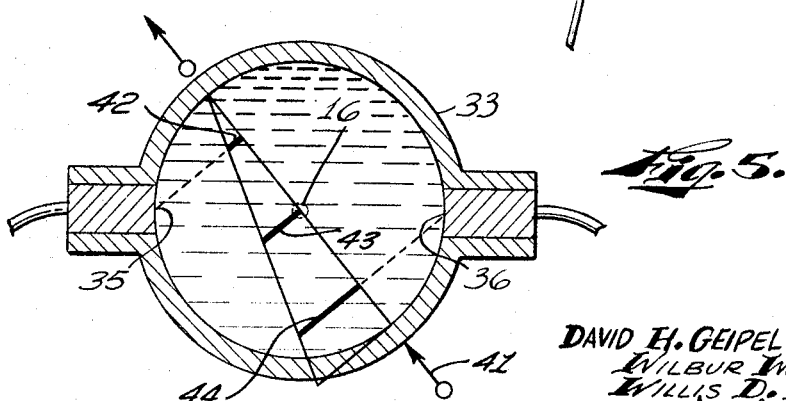

Other objects of the invention will become apparent from the following description read in conjunction with the accompanying drawings in which:

FIG. 1 is a view of an accelerometer illustrating one embodiment of the invention, FIG. 2 is an end view of another embodiment of the accelerometer of the invention, FIG. 3 is an end view of the accelerometer device of FIG. 2 particularly illustrating the temperature compensating means therefor, FIG. 4 is an end view of another aspect of the invention, and FIG. 5 is a schematic diagram illustrating the pressure gradient in the liquid of the accelerometer device of FIG. 4.

The accelerometer of this invention determines the magnitude of acceleration forces independent of direction and includes a spherical housing having a spherical chamber filled with liquid subject to acceleration forces. Means are provided for measuring the static pressure of the liquid in response to acceleration forces on the housing with the pressure of the liquid at the center of the housing being directly proportional to the magnitude of the acceleration forces. According to a secondary aspect of the invention, means are provided for compensating for changes in thermal expansion of the housing and liquid of the accelerometer device.

Referring now to the drawings, and in particular to FIG. 1, there is illustrated one embodiment of the invention. A spherical housing 11 has included therein a spherical chamber filled with a liquid 13. A pressure sensing device 14 is attached to the housing 11 and extends into the chamber to measure the pressure of the liquid 13 at the center 16 of the housing 11. The pressure of the liquid at the center 16 varies in direct proportion to the magnitude of an acceleration force applied to the housing 11 and is independent of the direction of the force. The accelerometer is therefore omidirectional.

During acceleration of the device of FIG. 1, a static pressure at any point in the liquid 13 is proportional to the acceleration $a$, with the density of the liquid $\rho$, and the distance $h$ of that point away from the effective free surface of the liquid remaining constant. The pressure measuring point is located at the center 16 of the chamber having a radius $r$. The pressure is then proportional to the acceleration force according to the equation: $\rho_s = a\rho r$. Thus, it may be seen that the pressure is independent of the direction of the application of the acceleration $a$. The housing 11 may be constructed of any solid material and in one embodiment is comprised of hard steel. The liquid 13 is desirably selected from liquids of high density characteristics such as mercury. The pressure sensor 14 may be selected from a number of highly reliable and accurate pressure sensing devices and is preferably of a type such as a strain gauge having high frequency sensing characteristics.

Referring now to FIGS. 2 and 3, there is illustrated another aspect of the invention in which a spherical housing 21 has a spherical chamber filled with a liquid 23 and a pressure sensor 24 rigidly attached to the housing 21. The sensor 24 has its pressure sensing point at the center 16 of the spherical chamber and housing. The chamber of the housing 21 has also included therein a sphere 27 smaller than the chamber and attached to the housing 21. The sphere 27 is selected from a material such as Invar having a coefficient of thermal expansion so that the expansion rates of the housing 21, the liquid 23, and the sphere 27 are balanced. In this manner, temperature changes which cause the liquid 23, the housing 21, and the sphere 27 to expand are compensated for. In this manner, the pressure on the liquid is independent of the temperature of the device. As illustrated in FIG. 3, an end view of the device of FIG. 2 the sphere 27 has a plurality of slots 29 extending from the outer diameter radially inward with a center cavity 30 communicating with the outer portion of the chamber having the liquid 23. The liquid 23 communicates with the center point 16 to enable the pressure sensor 24 to measure the static pressure of the liquid 23. In this manner the sphere 27 reduces the movement of the liquid 23 in the chamber in addition to providing temperature compensation. The sphere 27 is rigidly attached at a plurality of points to the housing 21 to prevent any movement of the liquid 23 during operation.

As has been noted with respect to the embodiment of FIG. 1, the pressure at the center point of the accelerometer is independent of the direction of application of acceleration forces and is directly proportional to the magnitude of such forces. A further aspect of the invention is illustrated in FIG. 4 in which a pair of transducers 31 and 32 are oppositely disposed and attached to a housing 33. A spherical chamber 34 within the housing 33 is filled with liquid. The pressure on the liquid is directly proportional to the acceleration forces from any direction on the housing 33. The oppositely disposed pressure sensors 31 and 32 measure the pressure at points 35 and 36 in the spherical chamber. The points 35 and 36 are equal distances from the center 16 of the spherical chamber. The sum of the pressures at points 35 and 36 during acceleration from any direction on the housing 33 will always be twice the value of the pressure at the center 16, which in turn is directly proportional to the acceleration force on the housing 33.

In FIG. 5, a schematic diagram of the pressure gradient on the liquid 23 caused by acceleration forces, an acceleration on the housing 33 in the direction as shown by the arrow 41 creates a pressure gradient. The pressure at the point 35 is indicated by the line 42, the pressure at the center point 16 is indicated by the line 43, and the pressure at the point 36 is indicated by the line 44. The sum of the lines 42 and 44 is equal to twice the value of the line 43 which is directly proportional to the acceleration force on the housing 33. The provision of a pair of pressure sensors in the embodiment of FIG. 4, assures that the shape of the spherical chamber will be maintained with accuracy and reliability without the necessity of placing a pressure sensor at the center to measure the pressure directly at the center point 16.

The system for a temperature compensation as disclosed in the embodiment of FIG. 2 minimizes any liquid movement within the chamber. When the thermal expansion rate of the liquid in the chamber is added to the very low expansion rate of the compensator the sum exactly equals the expansion rate of the housing material, thus providing no motion of the liquid in the chamber. The reduction in volume of the liquid in the chamber due to the compensating element does not increase any errors caused by the housing and pressure sensor diaphragm deflections. An alternative way of compensating for temperature would be to provide orifice means leading from the output of the spherical chamber to an accumulator for compensating for changes in volume of liquid due to temperature changes.

The single pressure sensor embodiment as illustrated in FIGS. 1 and 2, for example, has the advantage of eliminating the necessity for summing the output of the pair of pressure sensors in the device of FIG. 4. The single pressure transistor embodiment of FIG. 2 also prevents output errors which may be caused by interaction of two pressure sensor diaphragms during some impact conditions.

The omnidirectional accelerometer of the device of this invention is completely insensitive to direction of acceleration and has a broad range of sensitivity and frequency response. The device is particularly applicable to high impact conditions such as space applications wherein the sphere is dropped on a surface to measure acceleration at impact. The type of liquid utilized in the device may be any liquid or fluid of high density and may be selected from liquids such as mercury having the characteristic of high coefficient of expansion and high density.

Although the invention has been described and illustrated in detail, it is to be clearly understood that the same is by way of illustration and example only and is not taken by way of limitation, the spirit and scope of this invention being limited only by the terms of the appended claims.

We claim:
1. An accelerometer for determining the magnitude of acceleration forces from all directions comprising,
   a spherical housing responsive to omnidirectional acceleration forces,
   a spherical chamber within said housing filled with a liquid,
   a pair of oppositely disposed pressure sensors attached to said housing and extending into said chamber for measuring the static pressure of said liquid at opposite ends of said chamber, whereby the average pressure at said pair of pressure sensors is linearly proportional to the magnitude of said acceleration forces, and
   a sphere in said chamber smaller than said chamber and attached to said housing for compensating for changes in volumetric expansion of said liquid and said housing caused by changes in temperature.

2. An accelerometer for determining the magnitude of acceleration forces from all directions comprising,
   a spherical housing responsive to omnidirectional acceleration forces,
   said housing having a spherical chamber filled with a liquid,
   a sphere in said chamber smaller than said chamber, concentric with said chamber, and attached to said housing, the coefficient of thermal expansion of said sphere being predetermined to provide temperature compensation for said housing and said liquid,
   passages in said sphere communicating with the center of said sphere,
   a pressure sensor in the center of said sphere in communication with said passages for measuring the static pressure at the center of said sphere,
   whereby the pressure at the center of said sphere as measured by said pressure sensor is linearly proportional to the magnitude of said acceleration forces.

3. An accelerometer device comprising: a substantially spherical housing defining a substantially spherical chamber filled with liquid; substantially spherical means in said chamber smaller than said chamber, concentric therewith, and attached to said housing, the coefficient of thermal expansion of said spherical means being predetermined to provide temperature compensation for said housing and said liquid, said spherical means having passages extending to its surface and communicating with its center; and pressure sensing means disposed and adapted to measure pressure changes of said liquid substantially at the common center of said spherical means and spherical chamber, the pressure changes at the center of said chamber being a function of the magnitude of acceleration forces applied to said device.

References Cited by the Examiner

UNITED STATES PATENTS

| 2,037,949 | 4/1936 | Tate | 73—406 |
| 2,650,991 | 9/1953 | Ketchledge | 73—516 |
| 2,728,868 | 12/1955 | Peterson | 73—515 |
| 2,761,043 | 8/1956 | Larson | 73—393 X |
| 2,832,581 | 4/1958 | Youngs | 73—516 |

RICHARD C. QUEISSER, *Primary Examiner.*

JOSEPH P. STRIZAK, *Examiner.*

J. J. GILL, *Assistant Examiner.*